(12) United States Patent
Habert

(10) Patent No.: US 6,204,468 B1
(45) Date of Patent: Mar. 20, 2001

(54) FORCE-CONTROLLED RESISTANCE WELDING DEVICE

(75) Inventor: Patrick Habert, Paris (FR)

(73) Assignee: Regie Nationale des Usines Renault, Boulogne-Billancourt (FR)

( * ) Notice: Subject to any disclaimer, the term of this patent is extended or adjusted under 35 U.S.C. 154(b) by 0 days.

(21) Appl. No.: 08/952,827

(22) PCT Filed: Dec. 21, 1995

(86) PCT No.: PCT/FR95/01706

§ 371 Date: Dec. 4, 1997

§ 102(e) Date: Dec. 4, 1997

(87) PCT Pub. No.: WO96/20805

PCT Pub. Date: Jul. 11, 1996

(30) Foreign Application Priority Data

Dec. 30, 1994 (FR) .................................................... 94/5923

(51) Int. Cl.[7] .................................................. B23K 11/30
(52) U.S. Cl. ................................................................ 219/86.51
(58) Field of Search ............................. 219/86.51, 86.41, 219/86.61, 86.7

(56) References Cited

U.S. PATENT DOCUMENTS

| | | | | |
|---|---|---|---|---|
| 5,063,279 | * | 11/1991 | Rossi .................................. | 219/86.51 |
| 5,225,647 | * | 7/1993 | Dufrenne ........................... | 219/86.51 |
| 5,386,092 | * | 1/1995 | Dufrenne ........................... | 219/86.51 |
| 5,528,011 | * | 6/1996 | Kono et al. ....................... | 219/86.41 |
| 5,582,747 | * | 12/1996 | Sakai et al. ....................... | 219/86.41 |

FOREIGN PATENT DOCUMENTS

| | | |
|---|---|---|
| 0 278 185 A1 | 8/1988 | (EP) . |
| 0 278 185 B1 | 8/1988 | (EP) . |
| 0352154 * | 1/1990 | (EP) . |
| 0508874 * | 10/1992 | (EP) . |
| 2 585 976 | 2/1987 | (FR) . |
| 2585976 * | 2/1987 | (FR) . |

OTHER PUBLICATIONS

English abstract for Japanese document No. 60–196276.*
DVS—Berichte Band 143, 1992, Elektromotorische Widerstandsschwelbzange, N. Bahier et al., pp. 143–159 (no translation).

* cited by examiner

*Primary Examiner*—Clifford C. Shaw
(74) *Attorney, Agent, or Firm*—Oblon, Spivak, McClelland, Maier & Neustadt, P.C.

(57) ABSTRACT

Resistance welding device of the type comprising two welding electrodes (21, 31) that are displaceable in relation to one another and can clamp between them the sheet metal to be welded. One of said electrodes (31) is connected to driving means formed by a screw-nut mechanism (8, 9) operated by an electric motor (6), said driving means being connected to electronic control means (7) capable of controlling the force with which the electrodes (21, 31) clamp said sheet metal to be welded by controlling the supply current of the electric motor (6). The device of the invention is characterized in that said screw-nut mechanism transmitting the force of the motor (6) to the electrodes (21, 31) is highly efficient and reversible, and in that said electronic means (7) control the clamping force of said electrodes by a closed control loop using the value of the supply current passing through the electric motor (6).

6 Claims, 1 Drawing Sheet

FORCE-CONTROLLED RESISTANCE WELDING DEVICE

This invention concerns a stress-controlled resistance welding apparatus, used notably in automobile manufacturing for the assembly of vehicle bodies.

Already known, particularly through documents FR-A-2,585,976 and FR-A-88/09915, are clamp-type resistance welding machines containing two electrode-holding arms capable of moving in relation to one another and of clasping between the electrodes the sheets to be welded; at least one of the arms being connected to drive means, such as a screw-nut system operated by an electric motor run by a microcomputer unit designed, notably, to control the spacing of the electrodes and the stress exerted on the sheets. These resistance welding machines also present systems of electric current supply of the electrodes by means, notably, of welding transformers forming voltage reducers operated from control units capable of passing the current through the electrodes in predetermined cycles.

Such known machines must, in order to secure correct welding of the sheets and to maintain that welding quality at a constant level in the course of time, perfectly control the clamping stress applied by the electrodes on the sheets.

This adjustment of clamping stress of the electrodes is customarily applied according to the aforesaid prior art by following two distinct approaches:

either in open loop with the aid of electronic control of the electric motor, which makes it possible to manage the intensity of the supply current of the motor and, therefore, the torque of the latter, that method assuming that the clamping stress directly depends on the current supplying the motor, the output of the screw-nut system being known and presumed constant;

or else in closed loop by using a stress sensor which can be included in the mechanics of the welding apparatus between the motor and the screw or, better yet, in application of the stress.

The method of open-loop adjustment has the disadvantage of being imprecise, for it does not make it possible to control the stress that the electrodes really exert on the sheets; as for the method of closed-loop adjustment, it has the disadvantage of being expensive to use, necessitating an added sensor and its connector, which moreover can prove to be a source of failure of the resistance welding apparatus.

The object of this invention is, therefore, to remedy those disadvantages by offering a resistance welding apparatus making possible a regulation of stress which at the same time is extremely precise and simple to use.

The resistance welding apparatus according to the invention is of the type containing two welding electrodes capable of moving in relation to one another and of clasping between them the sheets to be welded, at least one of those electrodes being connected for that purpose to drive means formed by a screw-nut mechanism operated by an electric motor, those drive means being connected to electronic command means capable of controlling the force with which the electrodes clasp the sheets to be welded by managing the supply current of the electric motor.

According to the invention, the resistance welding apparatus is characterized in that the screw-nut mechanism transmitting the force of the motor to the electrodes is reversible and of high output and in that the electronic command means control the clamping stress of the electrodes through a closed-loop servomechanism across the image of the supply current running through the electric motor.

According to another characteristics of the resistance welding apparatus, subject of the invention, the helix angle of the thread of the screw of the screw-nut mechanism is greater than six degrees.

According to another characteristic of the resistance welding apparatus, subject of the invention, the helix angle of the thread of the screw of the screw-nut mechanism ranges between six and ten degrees.

According to another characteristic of the resistance welding apparatus, subject of the invention, the microcomputer constituting the electronic command means drives the current supplying the electric motor through a current generator, which relays to it via a specific link the image of the current supplying the electric motor.

The objects, aspects and advantages of this invention will be better understood according to the specification presented below of one embodiment of the invention, given by way of nonlimitative example, referring to the attached drawings, on which:

Only the elements necessary for understanding of the invention have been represented. To facilitate reading of the drawings, the same references are used to designate the same parts on both figures.

Figure 1:
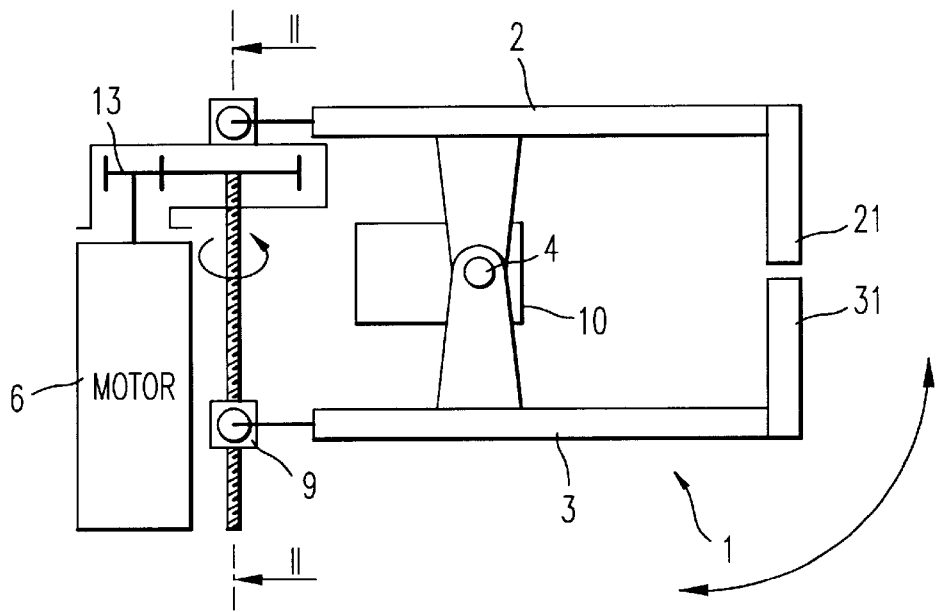
FIG. 1 is a schematic general view of a resistance welding apparatus according to the invention.

On FIG. 1 a resistance welding apparatus is represented with reference 1, as used notably in automobile manufacturing. This apparatus consists customarily of a frame 10 bearing a digital command welding head consisting of a so-called X-shaped clamp designed to make a weld spot. That clamp is formed by two arms 2 and 3, each ending in a welding electrode 21 and 31 respectively. Those electrodes are capable of moving in relation to one another and of clasping between them the sheets to be welded, not represented; in order to do so, one arm 2 is mounted stationary on the frame 10 and one arm 3 is mounted rotating on a joint 4.

The moving arm 3 is driven in rotation by means of a nut 9 jointed on the free end opposite electrode 31. That nut 9 is axially displaced by means of a screw drive system operated by an electric motor 6 commanded by a programmable microcomputer designed, in particular, to control the displacements of the moving arm 3 and to adjust the clamping stresses applied by the electrodes 21, 31 on the sheets to be welded.

The power supply of the electrodes is produced in a manner known per se by means of a control unit not represented, which runs the welding sequence in synchronization with the clamping of the sheets by the electrodes 21, 31 with the aid of a communication link between the microcomputer and the control unit.

Figure 2:
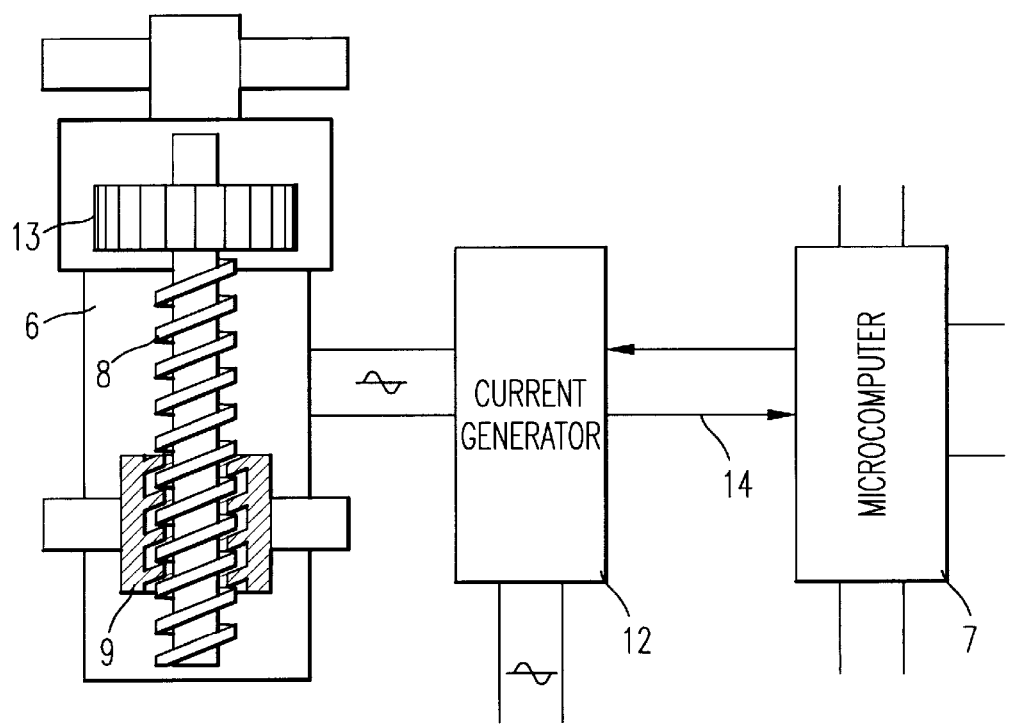
FIG. 2 is a partial cross section of the system driving the electrodes of the resistance welding apparatus along line II—II of FIG. 1.

The drive system of the moving arm 3 is specified in accordance with FIG. 2, the electric motor 6 of self-synchronous type or without slip ring, which is mounted jointed on the stationary arm, driving in rotation directly or as represented by means of a sprocket drive system 13 a roller screw 8 engaged in the corresponding nut 9 integral with the moving arm. Thus, rotation of the screw 8 in either direction results in the axial displacement of the nut 9, which produces a corresponding rotary motion of the arm 3 on its joint 4.

The electric motor 6 is therefore operated in both directions by a power variator forming a current generator 12 controlled by the microcomputer 7. The microcomputer 7 commands and controls displacement of the moving arm 3 up to contact of the sheets to be welded by the two electrodes 21, 31, and then it determines the stress to be applied by those electrodes on the sheets before the control unit executes the power supply of the latter. When the welding operation is completed, the microcomputer 7 separates arm 3 in order to release the sheets and permit the creation of a new weld spot.

The stress controlled by the microcomputer 7 is defined from preprogrammed values contained in its memory and that stress can be constant or even progressive in the course of the welding cycle chosen. The microcomputer 7 therefore deduces from that memorized value the instruction value of the current supplying the motor 6 and, therefore, the corresponding command of the current generator 12.

The microcomputer 7 then compares the instruction value of the current demanded with the real value crossing the motor 6, which is relayed to it by a specific link 14 connected to the current generator 12 and determines an error value which, multiplied by a predefined coefficient, gives the correction command to be applied to the current generator 12 in order to supply the motor 6 accordingly and to obtain the desired clamping stress of the electrodes.

That closed-loop correction of the stress applied to the weld spot in the course of the operation, subject of the invention, is based on a single measurement of the current crossing the electric motor 6, which therefore makes it possible to carry out very precisely control of the stress exerted on the electrodes, in a manner that is particularly simple to apply.

It is to be noted that, in order to make possible that closed-loop servomechanism of clamping stress of the welding electrodes, it is necessary to have a constant, accurate and repeatable relation between the value of the current supplying the motor 6 and the real stress applied between the electrodes, so that a given stress corresponds to a given current and vice versa. That relation is secured when the screw-nut drive system presents a high output and is mechanically reversible.

Those two conditions are satisfied by carefully choosing the helix angle of the screw. The applicant in fact was able to show that the system becomes mechanically reversible for a helix angle of the thread of the screw 8 greater than six degrees and that the output, which is maximum for a helix angle of approximately seven degrees, then steadily decreases. Consequently, the helix angle of the screw 8 is preferably chosen as ranging between six and ten degrees.

The invention is, of course, not at all limited to the embodiment specified and illustrated, which has been given only by way of example.

On the other hand, the invention embraces all the technical equivalents of the means described as well as their combinations, if the latter are made following its spirit.

Thus, the apparatus according to this invention is independent of the shape of the clamp defining the welding head, which therefore can be X-shaped with rotary motion, scissor-shaped or even J- or C-shaped with straight or sliding motion of the moving arm or arms.

What is claimed is:

1. Resistance welding apparatus comprising:

two welding electrodes which move in relation to one another and clasp between them the sheets to be welded, at least one of said welding electrodes being connected to a drive means which includes a screw-nut mechanism operated by an electric motor, said drive means being connected to an electronic command means for controlling the force with which the electrodes clasp said sheets to be welded by managing the supply current of said electric motor, means for supplying the electrodes with current, said screw-nut mechanism transmitting the force of the motor to the electrodes, being reversible and having a helix angle which causes said force and said supply current to have a linear relationship, and said electronic command means controlling the clamping stress of the electrodes through a closed-looped servomechanism using a sensed value of the supply current.

2. Resistance welding apparatus according to claim 1, characterized in that the helix angle is greater than six degrees.

3. Resistance welding apparatus according to claim 2, characterized in that the helix angle is between six and ten degrees.

4. Resistance welding apparatus according to claim 3, characterized in that a microcomputer constituting said electronic command means drives the current supplying the electric motor through a current generator, which relays to it via a specific link the a sensed value of the current supplying the electric motor.

5. Resistance welding apparatus according to claim 2, characterized in that a microcomputer constituting said electronic command means drives the current supplying the electric motor through a current generator, which relays to it via a specific link a sensed value of the current supplying the electric motor.

6. Resistance welding apparatus according to claim 1, characterized in that a microcomputer constituting said electronic command means drives the current supplying the electric motor through a current generator, which relays to it via a specific link a sensed value of the current supplying the electric motor.

* * * * *

UNITED STATES PATENT AND TRADEMARK OFFICE
CERTIFICATE OF CORRECTION

PATENT NO. : 6,204,468 B1          Page 1 of 1
DATED : March 20, 2001
INVENTOR(S) : Habert It is certified that error appears in the above-identified patent and that said Letters Patent is hereby corrected as shown below:

Title page.
Item [30], the Foreign Application Priority Data is incorrect.
Item [30] should read as follows:

[30]     Foreign Application Priority Data

Dec. 30. 1994 [FR]...........................94/15923

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*